(12) United States Patent
Cossette

(10) Patent No.: US 6,167,776 B1
(45) Date of Patent: Jan. 2, 2001

(54) AUXILIARY THROTTLE FOR SNOW MOBILES AND THE LIKE

(76) Inventor: David Clyde Cossette, P.O. Box 874855, Wasilla, AK (US) 99687

( * ) Notice: Under 35 U.S.C. 154(b), the term of this patent shall be extended for 0 days.

(21) Appl. No.: 09/314,241

(22) Filed: May 18, 1999

(51) Int. Cl.⁷ ................................. G05G 11/00
(52) U.S. Cl. ...................... 74/488; 74/480 R; 74/489
(58) Field of Search ................ 74/488, 489, 480 R

(56) References Cited

U.S. PATENT DOCUMENTS 5,775,167 * 7/1998 Maietta ............................. 74/480 R
5,941,125 * 8/1999 Watarai et al. ....................... 74/489

* cited by examiner

Primary Examiner—Lenard A. Footland
(74) Attorney, Agent, or Firm—Michael J. Tavella

(57) ABSTRACT

An auxiliary throttle attached to the underside of the throttle mechanism of an off-road type vehicle, such as a snowmobile. It is positioned on the backside of the handlebar and is operated by the thumb. The device has a stop built in that prevents the rider from engaging the throttle at more than half speed using the bar. The rider can increase speed, but only by using the main throttle. This has three beneficial effects. First, it provides a convenient and easy method for riders to operate the throttle without fatigue. Second, it is operated by the thumb, just like the main throttle, thereby preventing confusion in an emergency. Third, it limits the speed the vehicle can operate, no matter how hard the device is gripped. Thus, in a panic situation, gripping the handlebar does not cause any sudden burst of speed.

19 Claims, 3 Drawing Sheets

AUXILIARY THROTTLE FOR SNOW MOBILES AND THE LIKE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to auxiliary throttles for snowmobiles and similar off-road vehicles; and particularly to auxiliary throttles for snow mobiles and similar off-road vehicles that reduce the amount of effort needed to operate the throttle.

2. Description of Related Art

Snow mobiles, three-wheeler and four-wheeler type off-road vehicles operate with small gasoline powered engines. To operate the engines, the operator activates a thumb throttle. The thumb throttle is usually mounted to the right handlebar. As the rider grips this handlebar, the rider's thumb operates the throttle by pushing the throttle against the handle bar and holding it there. The throttle is designed to provide a range of speeds as the throttle is depressed. If the throttle is held fully open, the highest speeds can be reached. However, holding the throttle in between "off" and "full" produces an intermediate level of speed.

To keep the throttle from sticking in the open position, a spring is used to force the throttle back to the off position if the throttle is released. Although the spring provides an important safety function, it also causes fatigues in the rider. Holding the throttle against the force of the spring is tiresome and prevents enjoyment on long trips. Moreover, people with smaller hands suffer more because the thumb must be stretched out to grip the throttle. This puts additional strain on the rider.

Several solutions to this problem have been devised. The first is a modification of the throttle and spring so that the force required to hold the throttle is reduced for the first half of throttle travel. The force is increased for the remaining amount of travel. This provides some relief in that riders can operate the device under lower speeds with less strain. However, this improvement is not available on all machines; it limits the speeds an operator can ride in comfort; and does nothing to help riders with small hands. A second solution is a "cheater" bar that is installed on top of the handlebar. This bar is attached to the throttle and is operated by the user's fingers. As the user grips the bar tighter, the speed is increased. Although this makes riding more comfortable, it also makes it more dangerous. Because the rider grips the bar with the fingers, and because the tighter the grip the faster the device goes, a rider may cause more problems in a panic situation.

BRIEF SUMMARY OF THE INVENTION

The instant invention overcomes these problems. A bar attaches to the underside of the throttle mechanism. In that position, it rides on the back of the handlebar and is operated by the thumb like the standard throttle. Moreover, the device has a built-in stop that prevents the rider from engaging the throttle at more than half speed using the bar. The rider can increase speed, but only by using the main throttle. This has three beneficial effects. First, it provides a convenient and easy method for riders to operate the throttle without fatigue. Second, it is operated by the thumb, just like the main throttle, thereby preventing confusion in an emergency. Third, it limits the speed the vehicle can operate, no matter how hard the device is gripped. Thus, in a panic situation, gripping the handlebar does not cause any sudden burst of speed.

DETAILED DESCRIPTION OF THE INVENTION

Figure 1:
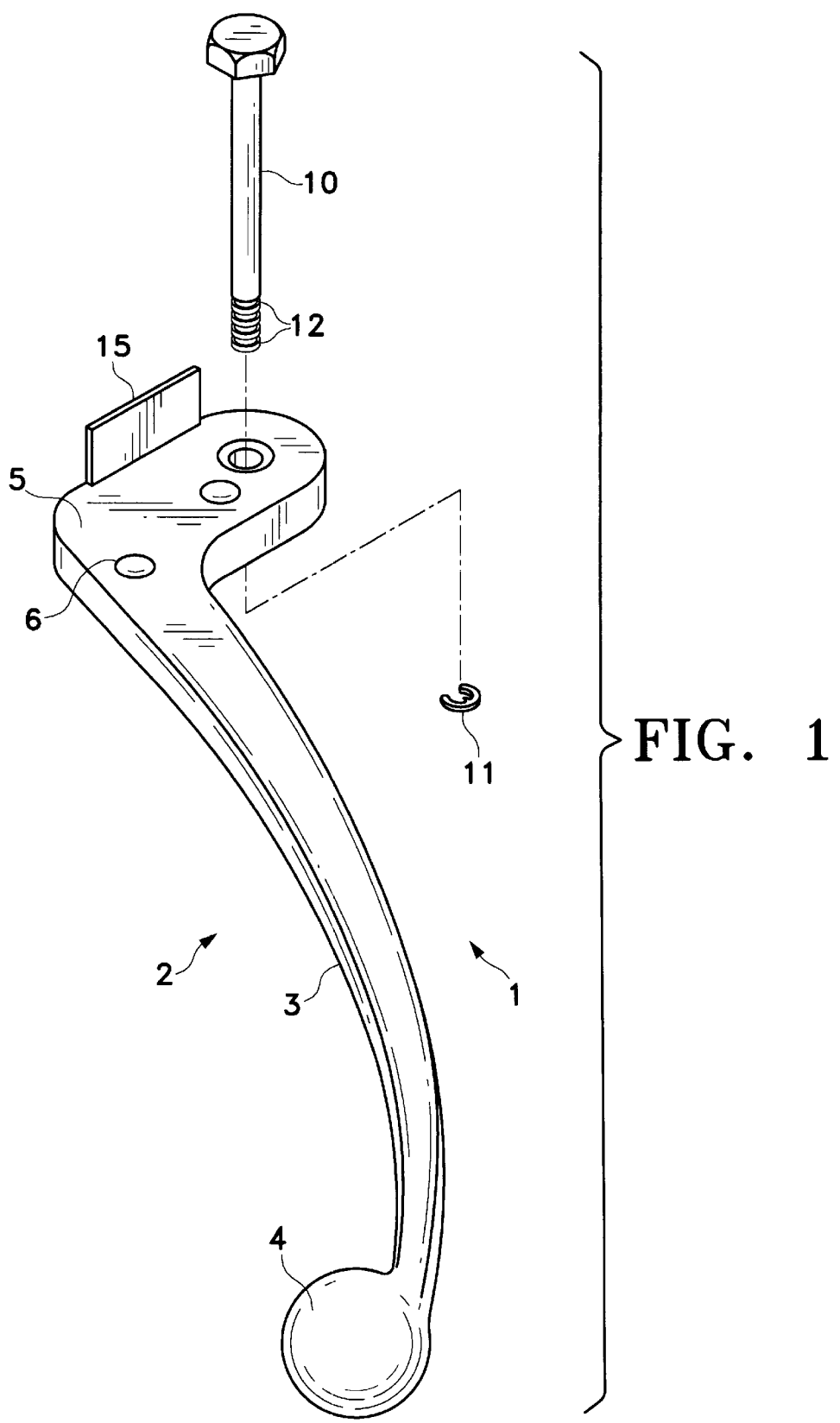
FIG. 1 is a perspective exploded view of the invention.

Referring now to FIG. 1, the invention 1 is shown. There are three parts to the invention. First, is the handle 2. The handle 2 has a long, extended portion 3. As shown, the handle has a round ball 4 that acts as a stop. Of course, this ball 4 can be omitted. The length of the handle 3 can be adjusted as well, depending on the preferences of different riders.

The extended portion 3 terminates at a mounting bracket 5. The mounting bracket has a curved body, as shown. In the preferred embodiment, the handle assembly 2 is molded in one piece from plastic or similar materials. Of course, it can be made of metal as well. As an alternative, the handle assembly can be made in two pieces. The extended portion 3 can be attached to the mounting bracket 5 by a pin 6. Of course, pin 6 can be a rivet, a nut and bolt, or any other similar fastener. If the handle assembly 2 is made of one piece, pin 6 is then omitted.

The other two parts of the invention are a mounting pin 10 and an "E" clip 11. The mounting pin has a long smooth body and a number of grooves 12 as shown. The grooves accept and hold the "E" clip 11 as shown. The mounting pin 10 replaces the pin used to hold the main throttle 100 to the vehicle (not shown). The original pin is typically provided by the manufacturer and is held by an "E" clip.

To install the device 1, the user first removes the "E" clip from the existing throttle pin. Next, the user pulls out the old pin and replaces it with pin 10. Then the user places the handle onto the bottom of the pin 10. See, e.g., FIGS. 2 and 3. Finally, the user secures the pin 10 with "E" clip 11.

A plate 15 extends above the top surface of the bracket 5. The plate 15 fits behind the throttle arm 100 of the snow-machine and pulls the throttle forward as the extended portion 3 is pushed forward with the user's thumb. The normal spring return on the throttle 100 shuts the throttle down when the lever is released. Because of the spacing of the extended portion 3, the throttle movement is limited to about one-half the normal throttle travel. Consequently, the device has a built in safety feature in that the snowmachine's speed is limited. If the user desires to go faster, the user can push on the original throttle to increase the speed of the snowmachine.

Figure 2:
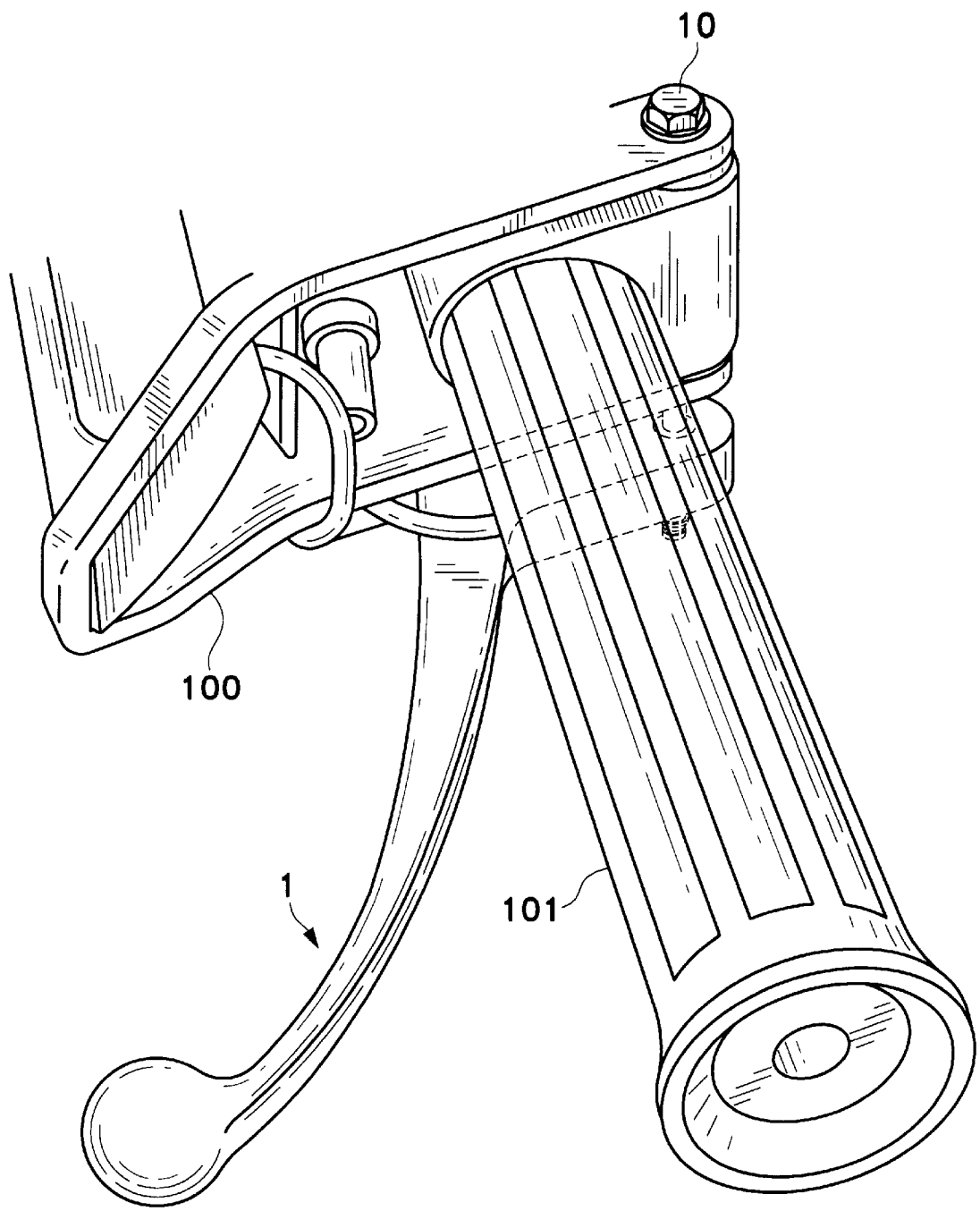
FIG. 2 is a detail perspective view of the invention installed in a snow machine from the rear of the throttle handlebar.
Figure 3:
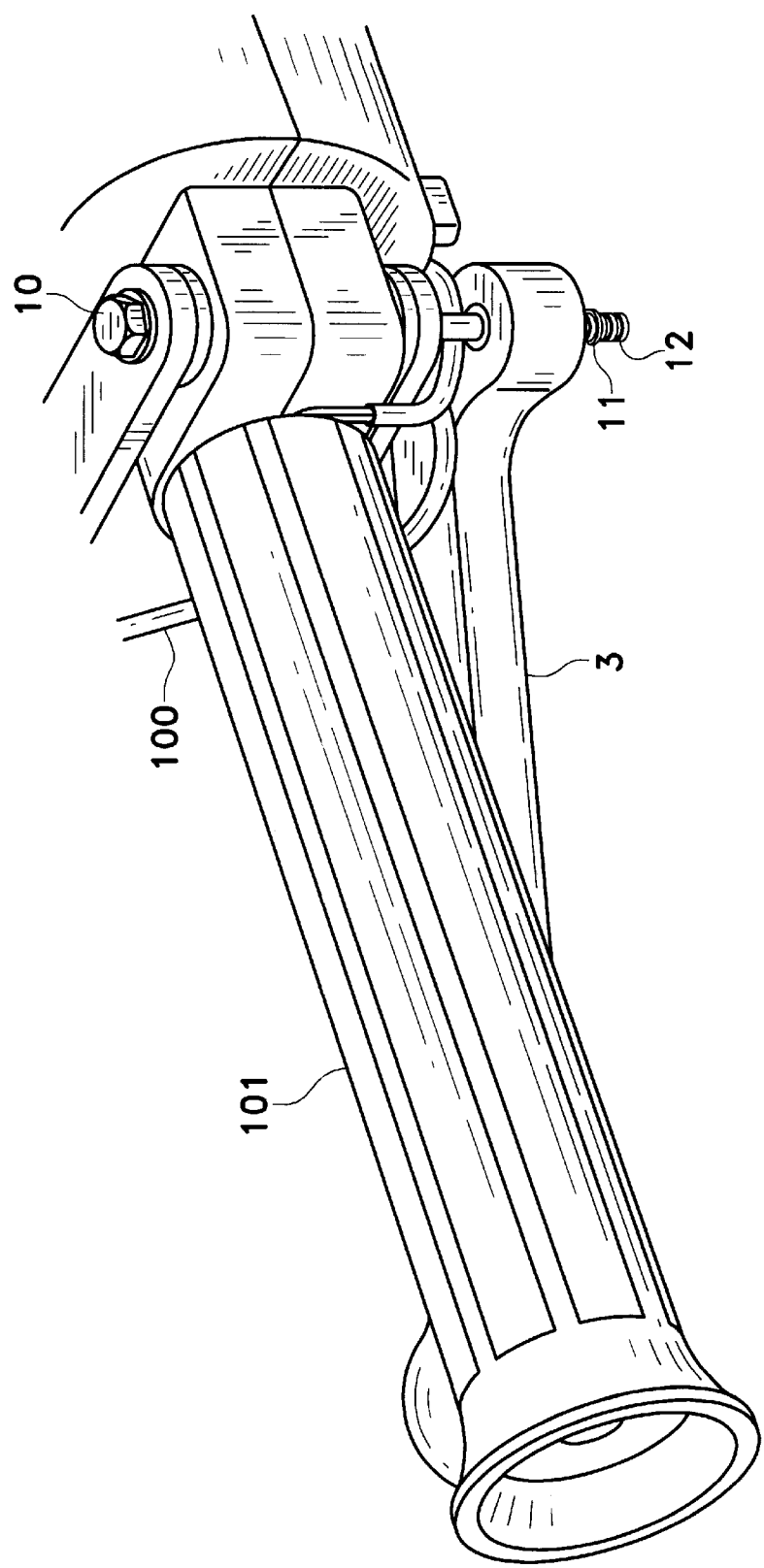
FIG. 3 is a perspective detail view of the invention installed in a snow machine from the front of the throttle handlebar.

As shown in FIGS. 2 and 3, the device is placed attached to the throttle 100 under the throttle handlebar 101 of the snowmachine. This is a convenient location for the device as it is consistent with the normal operation of a snowmachine. Moreover, there is an additional safety feature in that the placement of the device allows a rider to release the throttle in exactly the same way as a normal throttle is released. In a panic situation, it is important to move instinctively. This device allows a rider to do that. Other throttle devices are often operated in a different manner than the normal throttle.

FIG. 2 shows the back of the throttle handlebar. As this figure shows, the device 1 is attached to the throttle 100 by the pin 10 and the "E" clip 11. Once the pin 10 is secured, the throttle 100 can be operated either by the throttle itself, or by the handle 3. FIG. 3 shows the attachment of the device 1 to the throttle handlebar 101 from the front of the throttle handlebar. As shown, the rider's fingers cannot pull the handle 3 against the handlebar, providing safer operation of the vehicle.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An auxiliary throttle for a snow machine having a throttle-side handlebar comprising:
    a) a throttle lever, having a proximate end and a distal end, said throttle member having a movement, said movement further having a full extent;
    b) a mounting bracket, attached to the proximate end of said throttle lever; and
    c) means for pivotably mounting said mounting bracket to a snow machine throttle, such that said throttle lever is positioned below and behind the throttle-side handlebar of said snow machine.

2. The auxiliary throttle of claim 1 further comprising a means for restricting the movement of said throttle lever, such that said throttle lever restricts the movement of the snow machine throttle to about fifty percent of the full extent of the movement of the snow machine throttle.

3. The auxiliary throttle of claim 2 wherein the means for restricting the movement of said throttle lever comprises a flange, attached to said mounting bracket and extending upwardly therefrom.

4. The auxiliary throttle of claim 3 whereon the mounting bracket has an inside surface and an outside surface, and further wherein said flange is attached to said outside surface of said mounting bracket.

5. The auxiliary throttle of claim 3 wherein the throttle lever, mounting bracket and flange are molded in one piece.

6. The auxiliary throttle of claim 3 further comprising a means for fastening the mounting bracket to said throttle lever.

7. The auxiliary throttle of claim 1 wherein the throttle lever has a stop attached to the distal end of the throttle lever.

8. The auxiliary throttle of claim 7 wherein the stop comprises a rounded ball.

9. The auxiliary throttle of claim 1 wherein the means for pivotably mounting said mounting bracket to a snow machine throttle, such that said throttle lever is positioned below and behind the throttle-side handlebar of said snow machine comprise a pin and a means for securing said pin to said auxiliary throttle.

10. The auxiliary throttle of claim 9 wherein the pin further comprises at least one groove, formed in said pin.

11. The auxiliary throttle of claim 10 wherein the means for securing said pin to said auxiliary throttle comprise an "E" clip fastener, removably installed in said groove on said pin.

12. An auxiliary throttle for a snow machine having a throttle-side handlebar comprising:
    a) a throttle lever, having a proximate end and a distal end said throttle lever having a mounting bracket, attached to the proximate end of said throttle lever;
    b) a flange, attached to said mounting bracket and extending upwardly therefrom;
    c) means for pivotably mounting said mounting bracket to a snow machine throttle, such that said throttle lever is positioned below and behind the throttle-side handlebar of said snow machine.

13. The auxiliary throttle of claim 12 whereon the mounting bracket has an inside surface and an outside surface, and further wherein said flange is attached to said outside surface of said mounting bracket.

14. The auxiliary throttle of claim 12 wherein the throttle lever has a stop attached to the distal end of the throttle lever.

15. The auxiliary throttle of claim 14 wherein the stop comprises a rounded ball.

16. The auxiliary throttle of claim 12 wherein the throttle lever, mounting bracket and flange are molded in one piece.

17. The auxiliary throttle of claim 12 wherein the means for pivotably mounting said mounting bracket to a snow machine throttle, such that said throttle lever is positioned below and behind the throttle-side handlebar of said snow machine comprise a pin and a means for securing said pin to said auxiliary throttle.

18. The auxiliary throttle of claim 17 wherein the pin further comprises at least one groove, formed in said pin.

19. The auxiliary throttle of claim 18 wherein the means for securing said pin to said auxiliary throttle comprise an "E" clip fastener, removably installed in said groove on said pin.

* * * * *